US012188506B2

(12) United States Patent
Woo

(10) Patent No.: US 12,188,506 B2
(45) Date of Patent: Jan. 7, 2025

(54) PIPE CLAMPS

(71) Applicant: MSINTECH CO., LTD., Seoul (KR)

(72) Inventor: Cheol Seok Woo, Seoul (KR)

(73) Assignee: MSINTECH CO., LTD., Seoul (KR)

( * ) Notice: Subject to any disclaimer, the term of this patent is extended or adjusted under 35 U.S.C. 154(b) by 0 days.

(21) Appl. No.: 18/029,053

(22) PCT Filed: Sep. 1, 2021

(86) PCT No.: PCT/KR2021/011724
§ 371 (c)(1),
(2) Date: Mar. 28, 2023

(87) PCT Pub. No.: WO2022/065727
PCT Pub. Date: Mar. 31, 2022

(65) Prior Publication Data
US 2023/0375017 A1 Nov. 23, 2023

(30) Foreign Application Priority Data
Sep. 28, 2020 (KR) .......................... 10-2020-0125424

(51) Int. Cl.
F16B 2/12 (2006.01)
(52) U.S. Cl.
CPC ..................... F16B 2/12 (2013.01)

(58) Field of Classification Search
CPC ... F16B 2/12; F16B 7/0433; B62J 7/04; B62J 7/08; E03C 1/22; A47B 96/06; A47B 57/54; A47B 96/024; A47B 96/14; A47F 5/083
See application file for complete search history.

(56) References Cited

FOREIGN PATENT DOCUMENTS

| JP | 3825861 | B2 | * | 9/2006 |
|----|---------|-----|---|--------|
| KR | 200181313 | Y1 | * | 2/2000 |
| KR | 200368931 | Y1 | * | 12/2004 |
| KR | 20060099561 | A | * | 9/2006 |
| KR | 100646015 | B1 | * | 11/2006 |
| KR | 100762916 | B1 | * | 9/2007 |
| KR | 100813705 | B1 | * | 11/2007 |
| KR | 200456793 | Y1 | * | 11/2011 |
| KR | 10-2012-0081366 | A | | 7/2012 |
| KR | 101244419 | B1 | * | 7/2012 |
| KR | 20120081366 | A | * | 7/2012 |
| KR | 101210682 | B1 | * | 12/2012 |
| KR | 200470966 | Y1 | * | 1/2014 |
| KR | 20190125699 | A | * | 11/2019 |

* cited by examiner

Primary Examiner — Eret C McNichols
Assistant Examiner — Ding Y Tan
(74) Attorney, Agent, or Firm — Maschoff Brennan

(57) ABSTRACT

The present invention relates to pipe clamps, the pipe clamps being firmly fixed at set heights of pipes installed across the ceilings and floors of buildings to allow various members, such as shelves, holders, clothes hangers, to be selectively attached thereto for use.

3 Claims, 5 Drawing Sheets

[FIG. 1]
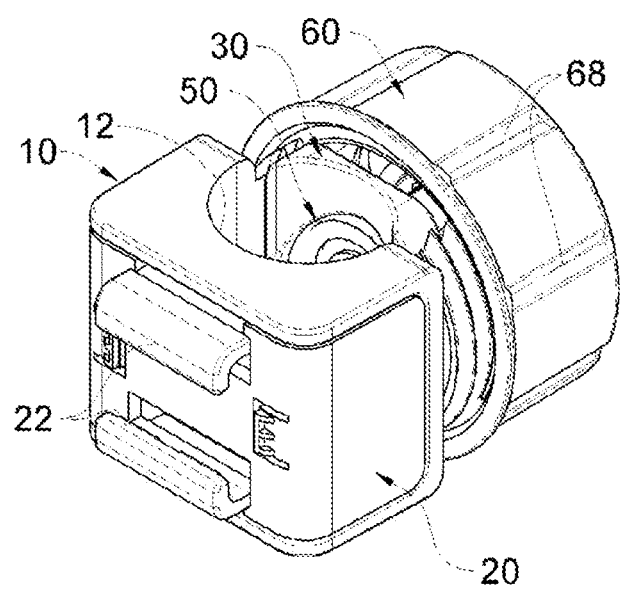

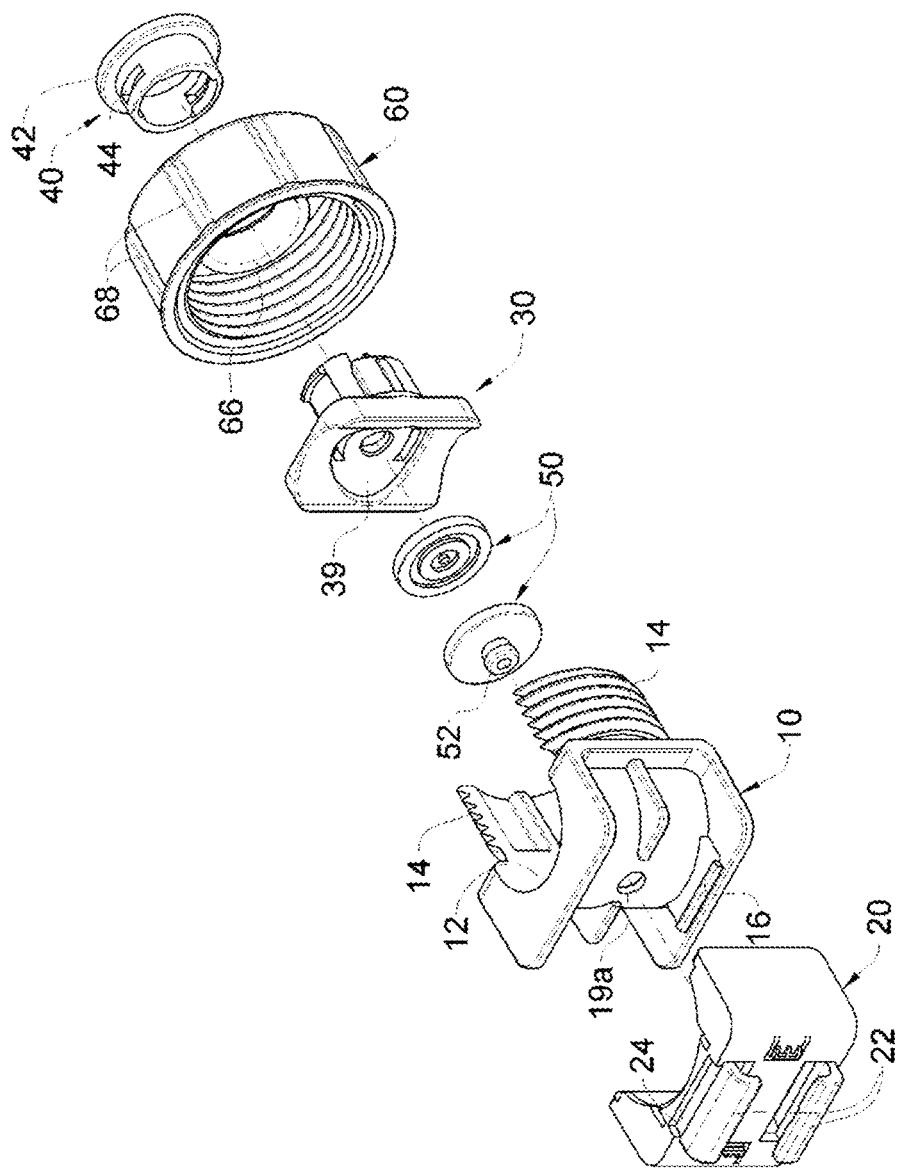
[FIG. 2a]

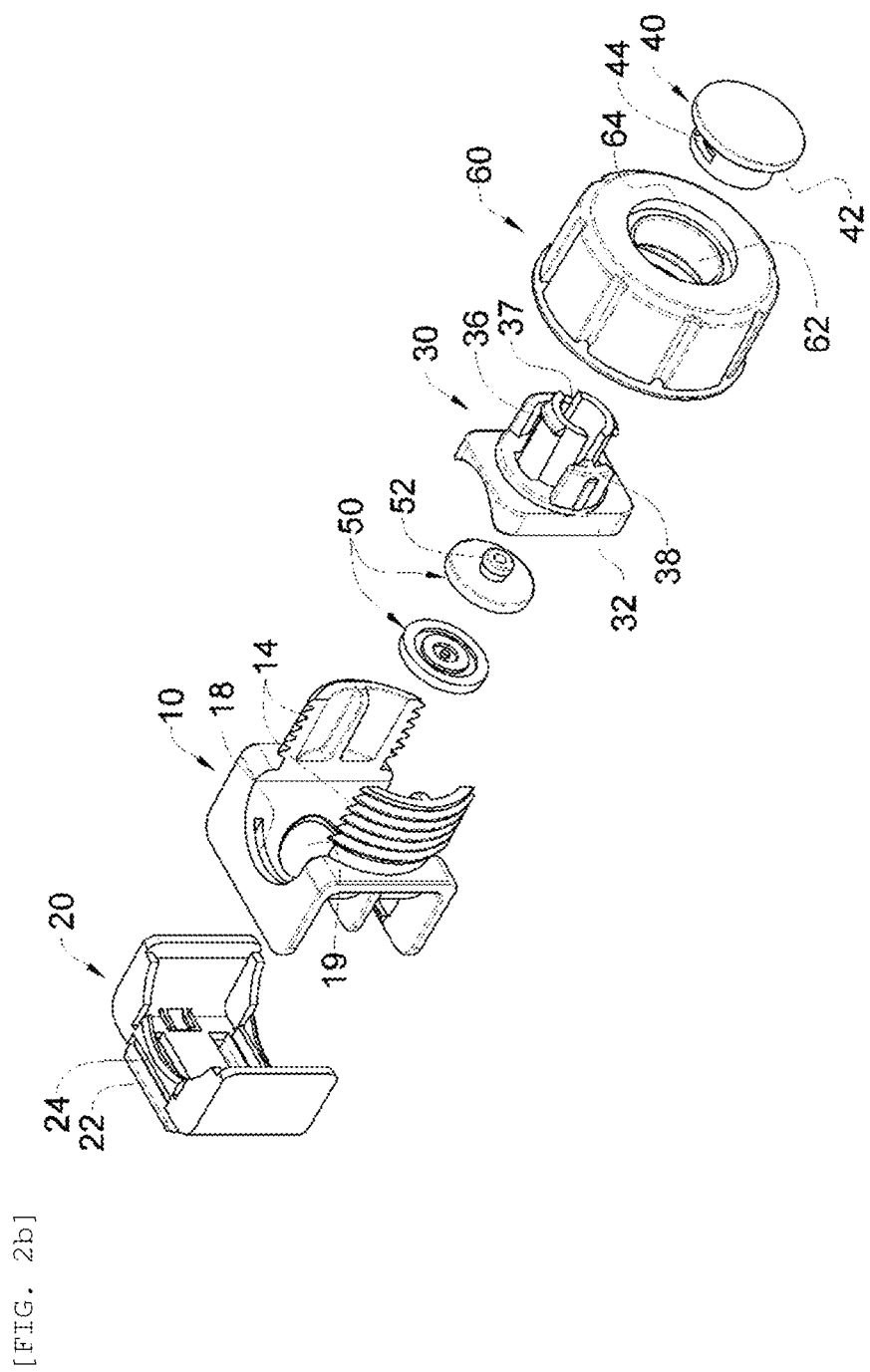
[FIG. 2b]

[FIG. 3]
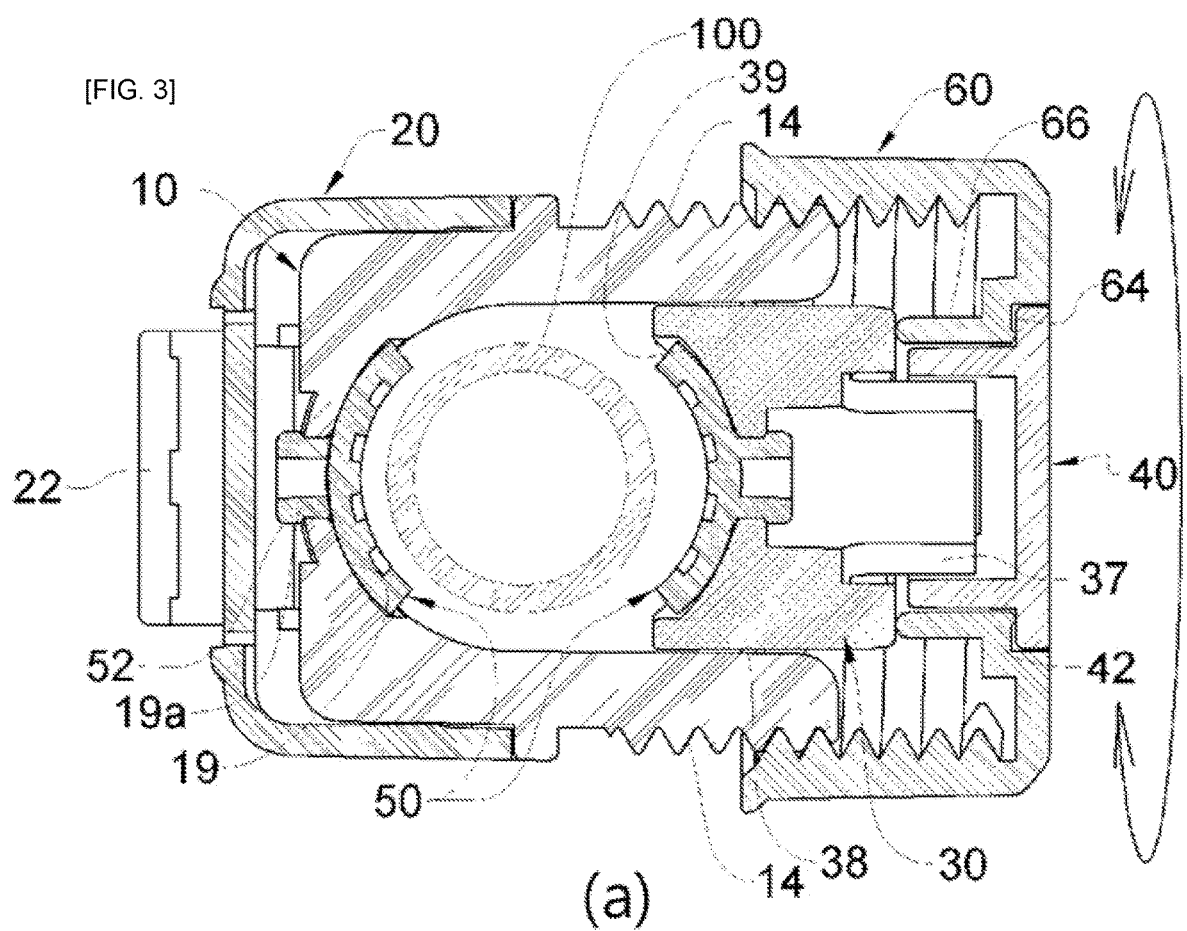
(a)
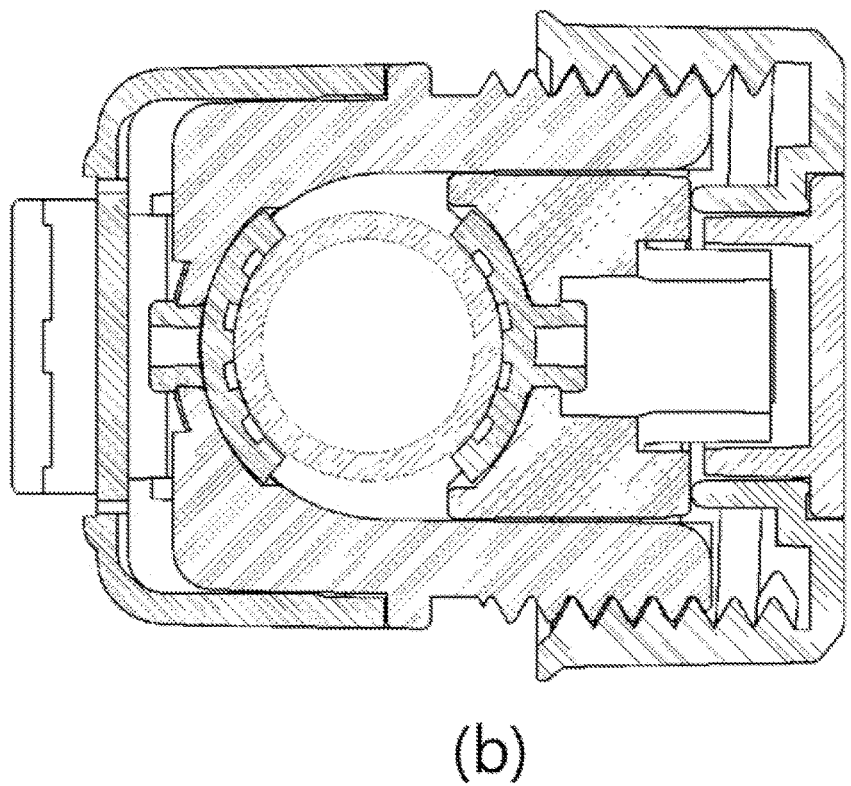
(b)

[FIG. 4]
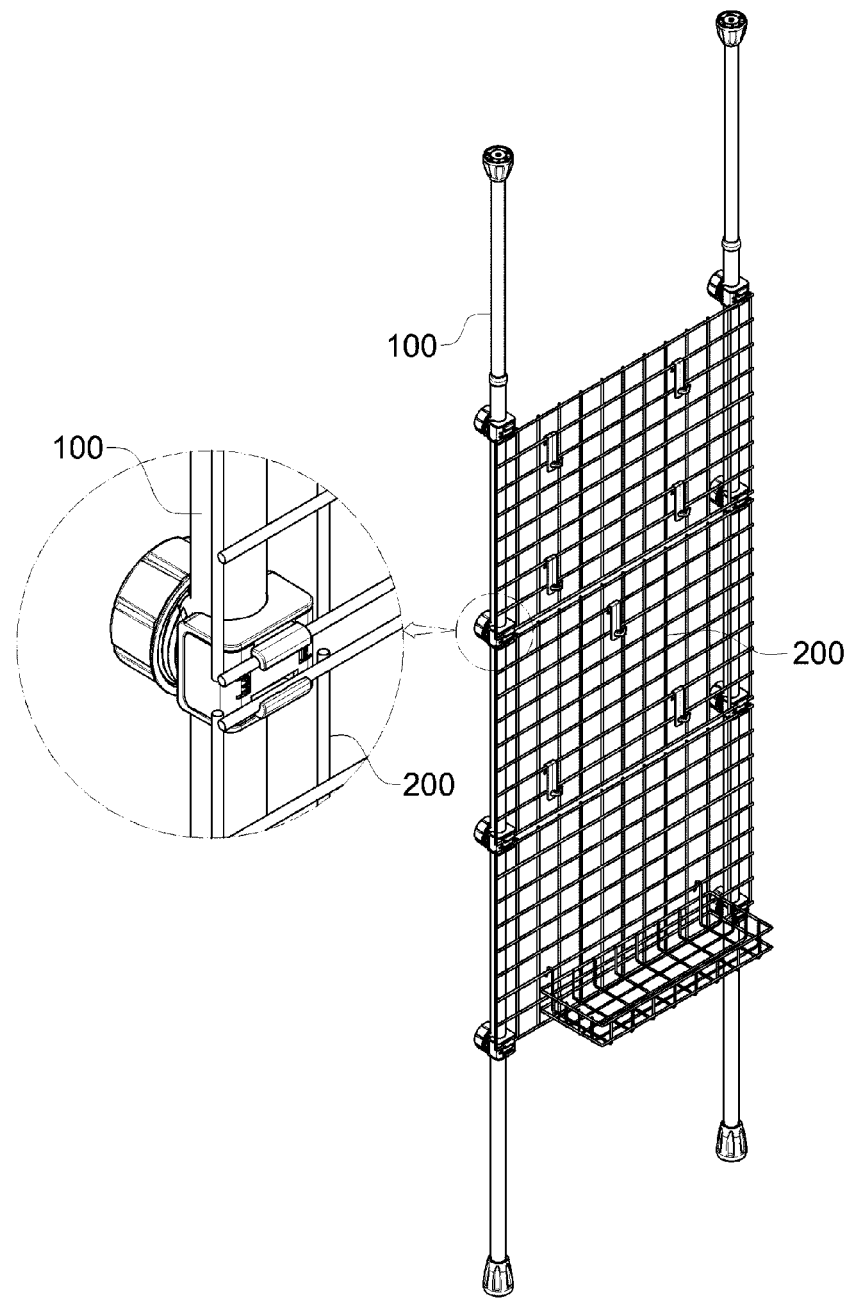

PIPE CLAMPS

TECHNICAL FIELD

The present invention relates to a pipe clamp, and more particularly, to a pipe clamp that is rigidly mounted on a pipe of a certain diameter so that various types of shelves or holders can be selectively installed.

BACKGROUND ART

As is well known, when shelves, hangers, holders, or the like are installed in homes, offices, stores, etc., pipes of a certain diameter are rigidly fixed and installed across the ceilings and floors of the structures, and then shelves, hangers, holders, or the like are equipped through the pipes.

In addition, various types of clamps are applied when shelves, hangers, various holders, or the like are installed through the pipes. Conventional pipe clamps can be roughly classified into a screw-type clamp and a lever-type clamp according to a method of fixing the clamp to the pipe.

Here, the screw-type clamp has a strong gripping force, but an installation method thereof is somewhat inconvenient, and the lever-type clamp is relatively easy to install, but the gripping force is slightly weak.

On the other hand, since conventional clamps provided to install predetermined members via pipes fixed at a predetermined point are manufactured and provided in a specific shape to correspond to shelves, hangers, or cradles applied to the pipes, as described above, there is a problem in that it is difficult to apply one clamp manufactured in a specific shape to correspond to the pipes to various product groups, thereby reducing the utilization of the pipes.

In addition, in the case of using conventional pipe clamps, the outer circumferential surfaces of pipes may be scratched or arbitrarily damaged as screw parts and cap parts of the clamps directly pressurize the pipes.

DISCLOSURE

Technical Problem

Therefore, the present invention has been made in view of the above problems, and it is one object of the present invention to provide a pipe clamp for selectively mounting various members, including shelves, holders, hangers, etc., while being firmly fixed to points having a certain height of pipes installed across the ceiling and floor of a building.

Technical Solution

In accordance with an aspect of the present invention, the above and other objects can be accomplished by the provision of a pipe clamp, including: a body on which a close contact groove is concavely formed to form a semicircular plane on a rear surface of a body part with a rectangular parallelepiped shape, wherein a ("shape and a")" shape are respectively formed to protrude from a rear surface of the body part corresponding to opposite sides of the concave groove and a pair of threaded coupling parts are provided on outer circumferential surfaces of the body part; a cap having an open front surface and fastened to a pair of coupling parts provided in the body via a thread formed on an inner circumferential surface thereof; and a shaft provided with a contact plate whose surface is concaved in an arc shape; and a fixation shaft mounted on a rear surface of the contact plate to be rotatable inside the cap.

Preferably, seating grooves may be concavely formed on mutually facing surfaces of a close contact groove of the body and a contact plate of the shaft, and an adhesion member made of disk-shaped rubber may be fixedly installed on each of the seating grooves.

Preferably, a through hole may be formed by boring a center of the cap, a rotation groove may be formed along an edge of the through hole on a rear surface of the cap, and a shaft support member performing a bearing function may be configured to be coupled to a fixation shaft of the shaft in a state of penetrating the through hole.

More preferably, the shaft support member may be integrally formed with a disk-shaped holding plate on a rear surface of the cylindrical body to penetrate the through hole in a state of being interrupted with a rotation groove of the cap, and a pair of coupling holes may be formed to correspond to each other and perforate the cylindrical body so that a pair of coupling protrusions provided on the fixation shaft of the shaft are inserted into and interrupted by the coupling holes.

In addition, an adapter equipped with a predetermined coupling means may be selectively mounted on a front surface of the body to form a body of a rectangular parallelepiped shape.

Advantageous Effects

By applying clamps of a specific structure to pipes installed over the ceiling and floor of a certain building according to the present invention as described above, the clamps can be rigidly installed at a point with a certain height of the pipes with a simple operation without a separate tool and can be very simply disassembled.

Here, as the clamps are fixed to pipes in a state in which adhesion members made of rubber are in contact with each other, the clamps can be applied to pipes having various diameters and can be more firmly fixed due to the frictional force of the adhesion members, and there is an effect of preventing any damage without leaving scratches on pipes even during repeated installation and disassembly.

In addition, as the pipe clamp of the present invention can be used by selectively mounting various types of adapters, various members including a shelf, a net, a hanger, or a holder can be installed on pipes according to the shape of the adapter to be applied.

DESCRIPTION OF DRAWINGS

FIG. 1 is a perspective view illustrating the configuration of a pipe clamp according to the present invention.

FIGS. 2A and 2B are exploded perspective views illustrating the configuration of the pipe clamp according to the present invention.

FIG. 3 is a flat sectional view illustrating a process in which the pipe clamp according to the present invention is installed on a pipe.

FIG. 4 is a use state diagram illustrating a state in which a net is installed using pipe clamps according to the present invention.

BEST MODE

Hereinafter, the present invention configured as described above is described in detail with reference to the accompanying drawings.

FIG. 1 is a perspective view illustrating the configuration of a pipe clamp according to the present invention, FIGS. 2A and 2B are exploded perspective views illustrating the configuration of the pipe clamp according to the present invention, and FIG. 3 is a flat sectional view illustrating a process in which the pipe clamp according to the present invention is installed on a pipe.

First, the pipe clamp according to the present invention rigidly fixes a clamp having a specific structure to a point having a certain height of a pipe 100 installed across a ceiling and floor of a certain building, so that various members including shelves, nets, holders, hangers, etc., can be firmly installed on the pipe 100.

For this, the pipe clamp according to the present invention includes a body 10 having a substantially rectangular parallelepiped shape; a cap 60 selectively fastened to one side of the body 10; a shaft 30 embedded between the body 10 and the cap 60; an adapter 20 selectively separated from the body 10; a shaft support member 40 for installing the shaft 30; a pair of adhesion members 50 in close contact with the outer circumferential surface of the pipe 100; and the like.

The body 10 is configured to have a body part of a substantially rectangular parallelepiped shape in a state in which the adapter 20 is integrally combined. On the rear surface of the body 10, a close contact groove 12 having a semicircular plane in accordance with the shape of the outer circumferential surface of the pipe 100 applied to the body 10 is concavely formed along a vertical direction. The rear surface of the body part corresponding to opposite sides of the concave groove has a substantially "(" shape and ")" shape, respectively, and a pair of threaded coupling parts 14 respectively protrude from outer circumferential surfaces of the body part.

A body part of the body 10 and the adapter 20 form a substantially rectangular parallelepiped shape in a mutually coupled state. For this, the body part of the body 10 consists of upper, lower and back plates, and the adapter 20 consists of front and side plates.

To connect the body 10 and the adapter 20 to each other, an interlocking jaw 24 of a predetermined depth is formed horizontally in a straight line shape on the upper and lower front surfaces of the adapter 20, and adapter coupling protrusions 16 having a structure corresponding to each other are protruded from a ceiling of an upper plate of the body 10 and a bottom of a lower plate thereof. In addition, to provide elastic force when each of the adapter coupling protrusions 16 acts, elastic holes 18 are formed in a straight line shape to perforate a back plate adjacent to the adapter coupling protrusions 16.

Various types of coupling means 22 may be formed on the front of the adapter 20, and various members including a predetermined net, shelf, holder, hanger, etc. may be coupled according to the shape of the coupling means 22 and may be mounted via the pipe 100.

In addition, a seating groove 19 is concavely formed in a substantially circular shape in the center of the close contact groove 12 of the body 10, so that the adhesion members 50 are seated on and coupled to the seating groove 19.

The adhesion members 50 may be made of a rubber material having a substantial disk shape, and may be rigidly fixed to the outer circumferential surface of the pipe 100 by using the frictional force of the material in a state of being fixed to the seating groove 19 of the body 10.

An insertion protrusion 52 is protruded from the center of one side of the adhesion members 50, and a hole 19a is formed by boring the seating groove 19 to correspond to the insertion protrusion 52, so that the adhesion members 50 may be rigidly fixed within the seating groove 19 of the body 10.

The cap 60 is formed of a substantially cylindrical shape with an open front surface, and is configured to be fastened to the pair of coupling parts 14 provided in the body 10 via a thread formed on an inner circumferential surface thereof. Here, a through hole 62 is formed by boring the center of the cap 60, the shaft support member 40 is installed to penetrate the through hole 62, and a rotational groove 64 is concavely formed to a predetermined depth along the edge of the through hole 62 on the rear surface of the cap 60.

In addition, a position-limiting protrusion 66 protrudes to a predetermined height while forming a substantially circular shape along the edge of the through hole 62 on the front of the cap 60.

Reference 68 represents anti-slip grooves concavely formed at regular intervals on the outer circumferential surface of the cap 60 to prevent slipping when gripping the cap 60.

The shaft support member 40 is installed to penetrate the through hole 62 of the cap 60 to perform a bearing function and is formed of a substantially cylindrical body, and a substantially disc-shaped holding plate 42 is integrally formed at the rear of the shaft support member 40 to be interrupted and supported by the rotation groove 64 of the cap 60.

In addition, a pair of coupling holes 44 are formed to perforate the cylindrical body constituting the shaft support member 40 so that a pair of coupling protrusions 36 provided in a fixation shaft 34 of the shaft 30 are inserted and interrupted.

The shaft 30 is provided with a contact plate 32 whose one surface is concavely formed to form an arc shape, and the substantially cylindrical fixation shaft 34 rotatably mounted inside the cap 60 is integrally formed on the rear surface of the contact plate 32.

The pair of coupling protrusions 36 protrude from the end of the fixation shaft 34 of the shaft 30 to be interrupted by being inserted into the coupling holes 44 of the shaft support member 40, and a pair of elastic grooves 37 are formed between the pair of coupling protrusions 36 to provide elastic force to the coupling protrusions 36.

A pair of position-limiting jaws 38 protrude to a certain height on both sides of the fixation shaft 34 of the shaft 30, so that when the cap 60 and the shaft 30 are combined, ends of the position-limiting jaws 38 are configured to stably support each other when the cap 60 rotates while abutting against the position-limiting protrusions 66 of the cap 60.

In addition, a seating groove 39 is concavely formed in a substantially circular shape at the center of the concave part of the contact plate 32 constituting the shaft 30 so that the adhesion members 50 are fixedly installed and frictional force is provided in close contact with the pipe 100.

Next, an operation of the present invention constituted as described above is described in detail below.

The pipe clamp according to the present invention is fixedly mounted at a point having a certain height of the pipe 100 installed vertically between the ceiling and the floor of a certain building, so that various types of members can be installed.

For this, the adapter 20 equipped with the predetermined coupling means 22 is mounted on the body 10 via the coupling protrusions 16 and interlocking jaw 24 corresponding to each other to form an integral structure.

In addition, In addition, the coupling protrusions 36 of the fixation shaft 34 of the shaft 30 are coupled to the coupling holes 44 of the shaft support member 40 in a state in which the shaft support member 40 is passed through the through hole 62 of the cap 60, so that the shaft 30 is mounted and provided in a rotatable state inside the cap 60.

Here, when the shaft support member 40 and the shaft 30 are coupled to each other, the coupling protrusions 36 of the fixation shaft 34 of the shaft 30 are rigidly coupled in a press-fitting manner to the coupling holes 44 of the shaft support member 40 through the elastic action of the elastic grooves 37 provided on the fixation shaft 34 of the shaft 30.

In addition, when the pipe clamp is installed on a pipe having a certain diameter, the close contact groove 12 of the body 10 integrally equipped with the adapter 20 is positioned to correspond to a point having a certain height of the pipe 100, and in a state where the contact plate 32 of the shaft 30 mounted on the cap 60 is in close contact with a point having the same height as the pipe 100, the cap 60 is rotated in a tightening direction so that the thread on the inner circumferential surface of the cap 60 is fastened to the outer circumferential surface of the coupling parts 14 of the body (see FIG. 3).

As the body 10 and the cap 60 are fastened together, the shaft 30 moves forward by a certain distance so that the respective adhesion members 50 pressurize the outer circumferential surface of the pipe 100 while the gap between the body 10 and the seating grooves 19 and 39 of the shaft 30 is narrowed, whereby the clamp can be rigidly fixed to a point with a certain height of the pipe 100.

Accordingly, after a certain member is rigidly installed at a certain point of the pipe 100 using the coupling means 22 of the adapter 20 provided in the clamp, it can be conveniently used according to the purpose.

Here, as the clamp has a structure in which the pair of adhesion members 50 provided on the body 10 and the shaft 30 pressurize the outer circumferential surface of the pipe 100, the clamp may be installed regardless of the diameter of the pipe 100, may maintain a very firm fixation state through the frictional force of the pair of adhesion members 50, and may prevent any damage such as scratches when pressurizing the pipe 100.

That is, after coupling the clamps to a pair of the pipes 100, respectively, a net 200 may be installed via the coupling means 22 of a specific structure, or various members such as a shelf, a holder, and a hanger may be installed on the pipe 100 by applying the adapter 20 having various other coupling means to the body 10, as shown in FIG. 4.

In addition, when disassembling the clamp, the cap 60 is simply separated from the body 10 and the clamp is removed from the pipe 100 as the cap 60 is rotated in a dismantling direction.

As described above, various embodiments of the present disclosure have been illustrated and described, but the present disclosure is not limited to the specific embodiments described above. Various modifications may be made by those with ordinary knowledge in the technical field to which the invention belongs without departing from the gist of the present disclosure claimed in the claims, and these modifications should not be understood individually from the technical spirit or perspective of the present disclosure.

The invention claimed is:

1. A pipe clamp, comprising:
a body on which a close contact groove is concavely formed to form a semicircular plane on a rear surface of a body part with a rectangular parallelepiped shape, wherein a ("shape and a")" shape are respectively formed to protrude from a rear surface of the body part corresponding to opposite sides of the concave groove and a pair of threaded coupling parts are provided on outer circumferential surfaces of the body part;
a cap having an open front surface and fastened to a pair of coupling parts provided in the body via a thread formed on an inner circumferential surface thereof; and
a shaft provided with a contact plate whose surface is concaved in an arc shape; and a fixation shaft mounted on a rear surface of the contact plate to be rotatable inside the cap,
wherein a through hole is formed by boring a center of the cap, a rotation groove is formed along an edge of the through hole on a rear surface of the cap, and a shaft support member performing a bearing function is configured to be coupled to a fixation shaft of the shaft in a state of penetrating the through hole, and
wherein the shaft support member is integrally formed with a disk-shaped holding plate on a rear surface of the cylindrical body to penetrate the through hole in a state of being interrupted with a rotation groove of the cap, and a pair of coupling holes are formed to correspond to each other and perforate the cylindrical body so that a pair of coupling protrusions provided on the fixation shaft of the shaft are inserted into and interrupted by the coupling holes.

2. The pipe clamp according to claim 1, wherein seating grooves are concavely formed on mutually facing surfaces of a close contact groove of the body and a contact plate of the shaft, and an adhesion member made of disk-shaped rubber is fixedly installed on each of the seating grooves.

3. The pipe clamp according to claim 1, wherein an adapter equipped with a predetermined coupling means is selectively mounted on a front surface of the body to form a body of a rectangular parallelepiped shape.

* * * * *